United States Patent
Suzuki et al.

(10) Patent No.: US 7,924,076 B2
(45) Date of Patent: Apr. 12, 2011

(54) DATA RECOVERY CIRCUIT

(75) Inventors: Naoki Suzuki, Tokyo (JP); Hitoyuki Tagami, Tokyo (JP); Masamichi Nogami, Tokyo (JP); Junichi Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 12/377,081

(22) PCT Filed: Sep. 4, 2006

(86) PCT No.: PCT/JP2006/317431
§ 371 (c)(1),
(2), (4) Date: Feb. 10, 2009

(87) PCT Pub. No.: WO2008/029438
PCT Pub. Date: Mar. 13, 2008

(65) Prior Publication Data
US 2010/0164575 A1 Jul. 1, 2010

(51) Int. Cl.
*H03L 7/06* (2006.01)
(52) U.S. Cl. .................................. 327/159; 327/165
(58) Field of Classification Search .................. None
See application file for complete search history.

(56) References Cited

U.S. PATENT DOCUMENTS

| | | | |
|---|---|---|---|
| 5,834,980 A | 11/1998 | Pitio et al. | |
| 7,450,677 B2 * | 11/2008 | Yu et al. | 375/371 |
| 7,667,544 B2 * | 2/2010 | Sugawara et al. | 331/1 A |
| 2003/0227310 A1 | 12/2003 | Iwata | |
| 2004/0258410 A1 | 12/2004 | Yajima et al. | |
| 2006/0067453 A1 * | 3/2006 | Duelk | 375/376 |
| 2006/0140309 A1 * | 6/2006 | Kuo et al. | 375/326 |

FOREIGN PATENT DOCUMENTS

| | | |
|---|---|---|
| JP | 7 221744 | 8/1995 |
| JP | 2002 94494 | 3/2002 |
| JP | 2004 15689 | 1/2004 |
| JP | 2004 266405 | 9/2004 |
| JP | 2005 12305 | 1/2005 |
| JP | 2005 39519 | 2/2005 |
| JP | 2005 045525 | 2/2005 |
| JP | 2005 151424 | 6/2005 |

OTHER PUBLICATIONS

Japanese Office Action (with English translation) issued on Oct. 27, 2010, in Japanese Patent Appln. No. 2009-7005492 (16 pages).
Korean Office Action (with English translation) issued on Oct. 27, 2010, in Japanese Patent Application No. 2009-7005492 (16 pages).

* cited by examiner

*Primary Examiner* — Cassandra Cox
(74) *Attorney, Agent, or Firm* — Oblon, Spivak, McClelland, Maier & Neustadt, L.L.P.

(57) ABSTRACT

Provided is a data recovery circuit including an input data phase detection circuit for outputting a gate signal synchronized with a rising phase of input data, a gated multiphase oscillator for instantly generating N-phase clocks based on the gate signal as a trigger, data discriminating and reproducing circuits for outputting sampled data of the input data which are synchronized with the clocks, a continuous clock generation circuit for generating a continuous clock which is a reference clock, continuous clock synchronization circuits for synchronizing the sampled data with the continuous clock and outputting the synchronized sampled data as phase synchronization data, and a phase selector for selecting the phase synchronization data having an optimum discrimination phase with the largest phase margin with respect to the input data and outputting the selected phase synchronization data as recovery data.

11 Claims, 8 Drawing Sheets

US 7,924,076 B2

DATA RECOVERY CIRCUIT

TECHNICAL FIELD

The present invention relates to a data recovery circuit for extracting, from input data, a clock synchronized in phase with the input data to reproduce the clock and discriminating and reproducing the input data based on the reproduced clock.

BACKGROUND ART

With the rapid growth of the Internet in recent years, a large scale broadband connection in a subscriber access network has been required. The mainstream of a system containing the broadband access network is a passive optical networks (PON) system in which a parent station device (optical line terminal (OLT)) is connected to subscriber devices (optical network units (ONUs)) through an optical fiber. The system structure is internationally standardized in, for example, Non-Patent Document 1.

In the PON system, a time division multiplexing (TDM) method of performing temporal multiplexing is applied as a method of receiving light signals from the respective subscriber devices (ONUs). Therefore, a common system capable of containing the plurality of subscriber devices (ONUs) can be constructed using a single-core optical fiber transmission line, and hence the broadband access network can be economically constructed.

The temporally multiplexed signals are burst light signals obtained by intermittently emitting/interrupting the light signals, and hence technical problems specific to input burst light signals occur in the parent station device (OLT) which is a receiver device.

A normal optical receiver provided in the parent station device (OLT) includes an optical preamplifier for converting an input burst light signal into an electrical signal (input data) having a discriminable amplitude, and a data reproducing (clock and data recovery (CDR)) circuit for extracting a clock component from the input data and performing data recovery based on phase synchronization information. A phased lock loop (PLL) circuit using a continuous voltage controlled oscillator is normally used as a clock extraction system in the data recovery circuit. In the PLL system, a control signal substantially close to a DC component is applied as a control signal for frequency and phase control. This is used to suppress fluctuation components (jitters) generated from the oscillator and the PLL. Accordingly, it is essentially difficult for a feedback-controlled clock extraction circuit such as the PLL to obtain high-speed response characteristics.

On the other hand, the burst light signals in the PON system described above include light signals output from the plurality of subscriber devices (ONUs) with different transmission distances, and hence the respective burst light signals have various different reception phases. In addition, the frequencies of the burst light signals are synchronized with frequencies output from the respective subscriber devices (ONUs), and thus have a relative frequency deviation. Therefore, the data recovery circuit in the parent station device (OLT) is required to have a function for performing clock extraction and data recovery based on phase synchronization for each of the burst light signals at high speed. However, as described above, in the normal PLL system, it is difficult to realize stable clock extraction from a light signal whose frequency and phase vary at high speed.

A data recovery circuit for extracting a clock from the burst light signal at high speed has been proposed (see, for example, Patent Document 1). The conventional data recovery circuit generates, from received data, a gating signal synchronized with a rising phase or falling phase of input data. In an embodiment described in Patent Document 1, a toggle flip-flop whose output logic is reversed at a rising or falling edge of the input data is applied as a gating signal generating means. A gated oscillator which performs oscillation outputting or stopping in instant synchronization with the gating signal is provided, and hence the clock synchronized with the rising phase or falling phase of the input data is generated. In the embodiment, outputs of two gated oscillators which perform oscillation outputting or stopping based on the positive logic and negative logic of the gating signal are combined in an OR gate, and hence clocks instantly synchronized in phase with the input data can be successively generated.

The conventional data recovery circuit provides a high-speed clock extraction means even when phase information included in data input from the respective subscriber devices (ONUs) are uneven and temporally intermittent burst light signals are input.

Patent Document 1: JP 2005-45525 A
Non-Patent Document 1: IEEE 802.3ah Standard (2004)

DISCLOSURE OF THE INVENTION

Problems to be solved by the Invention

However, actual input data has a signal waveform distorted by a fluctuation of an optical transmitter provided in the subscriber device (ONU), chromatic dispersion or polarized mode dispersion of an optical fiber transmission line, or the like. Therefore, there is a problem in that the distorted waveform has an influence such as deterioration due to superimposition of a jitter component on the optical receiver provided in the parent station device (OLT).

FIGS. 8A and 8B illustrate operations of the conventional data recovery circuit in a case where the jitter component is not included in the input data and in a case where the jitter component is superimposed thereon. As illustrated in FIGS. 8A and 8B, because a discrimination phase point for an extraction block is normally set based on a fixed delay time period, when an error of a phase of the extraction clock is caused by a jitter component, a problem occurs in which discrimination cannot be performed at an optimum phase clock in the conventional data recovery circuit. In the worst case, discrimination cannot be performed.

The present invention has been made to solve the problems as described above. Therefore, an object of the present invention is to obtain a data recovery circuit capable of reproducing data discriminated from input data in an optimum discrimination phase at high speed and outputting data synchronized with a reference clock, even when a jitter component is superimposed on an input temporally intermittent burst light signal from a subscriber device (ONU).

Means for Solving the Problems

A data recovery circuit according to the present invention includes: an input data phase detection circuit for extracting, as a gate signal, a signal synchronized with input data from the input data and outputting the gate signal; a gated N-phase oscillator for generating N-phase clocks obtained by dividing a bit width of the input data into N in phase synchronization with the gate signal output from the input data phase detection circuit; N data discriminating and reproducing circuits for sampling the input data based on the N-phase clocks output from the gated N-phase oscillator and outputting sampled data; a continuous clock generation circuit for generating a continuous clock which is a reference clock; N continuous clock synchronization circuits for synchronizing the sampled data output from the N data discriminating and reproducing circuits with the continuous clock output from the continuous clock generation circuit and outputting the synchronized sampled data as phase synchronization data; and a phase selector for selecting, from the phase synchronization data output from the N continuous clock synchronization circuits, phase synchronization data having an optimum discrimination phase with a largest phase margin with respect to the input data and outputting the selected phase synchronization data as recovery data.

EFFECTS OF THE INVENTION

According to the data recovery circuit in the present invention, an effect is obtained in which even when the jitter component is superimposed on the input temporally intermittent burst light signal from the subscriber device (ONU), the data discriminated from the input data in the optimum discrimination phase at high speed can be reproduced and the data synchronized with the reference clock can be output.

BEST MODE FOR CARRYING OUT THE INVENTION

The present invention relates to a PON system. In the PON system, a parent station device (OLT) is connected to a subscriber device (ONU) through an optical fiber. An optical receiver is provided in the parent station device (OLT). The optical receiver includes an optical preamplifier and a data recovery circuit.

Embodiments 1 to 3 of the present invention relate to the data recovery circuit, and more particularly, to a data recovery circuit for extracting a clock at high speed and reproducing and extracting received data at a clock with an optimum phase for a retiming of the received data, even when a jitter component is superimposed on an input signal waveform of a temporally intermittent burst light signal from a subscriber device (ONU).

Embodiment 1

Figure 1:
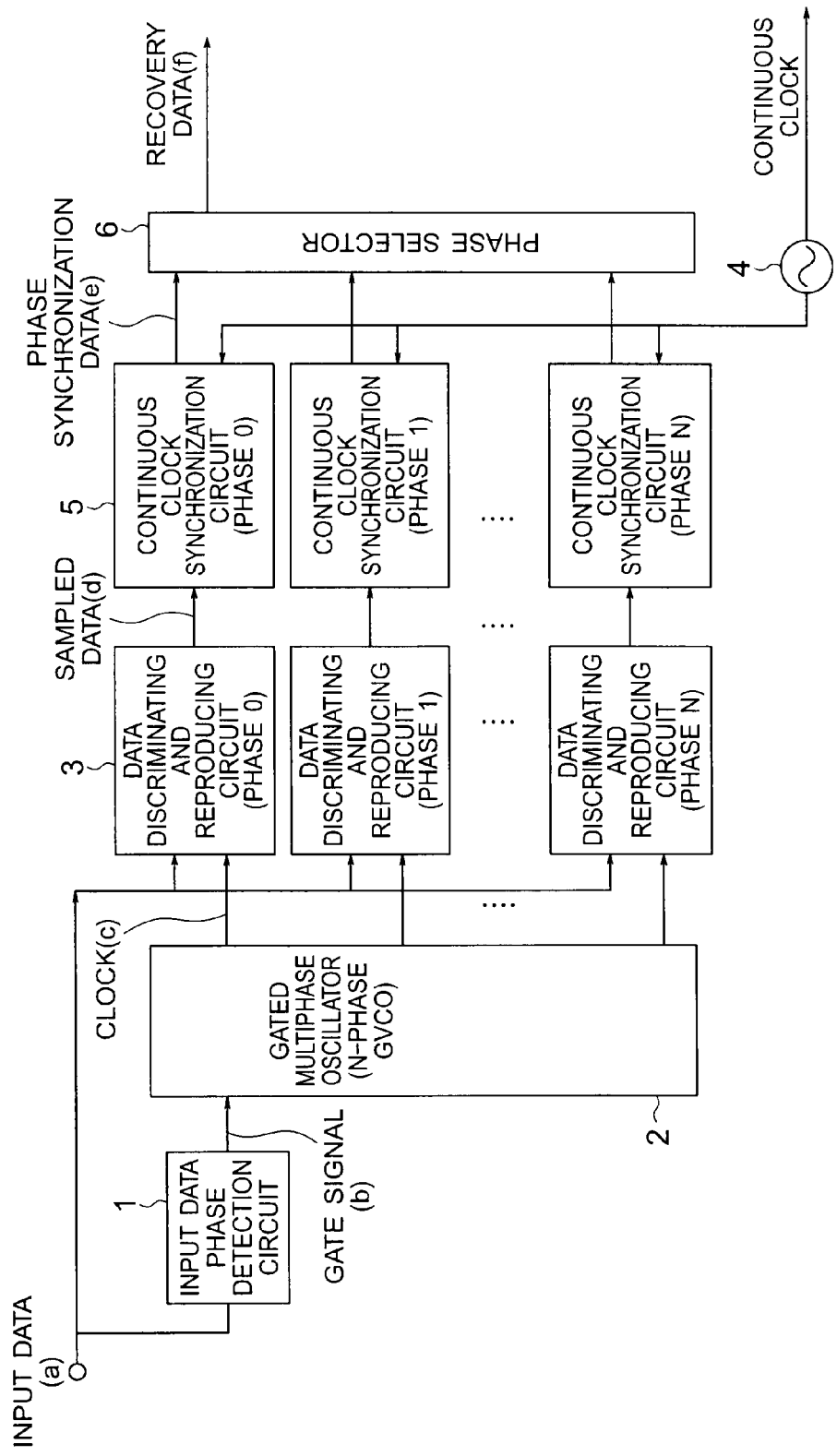
FIG. 1 is a block diagram illustrating a structure of a data recovery circuit according to Embodiment 1 of the present invention.

A data recovery circuit according to Embodiment 1 of the present invention is described with reference to FIGS. 1 to 4. FIG. 1 is a block diagram illustrating a structure of the data recovery circuit according to Embodiment 1 of the present invention. Hereinafter, in each of the drawings, the same reference symbols indicate the same or corresponding portions.

In FIG. 1, the data recovery circuit according to Embodiment 1 includes an input data phase detection circuit 1, a gated multiphase oscillator (N-phase gated voltage controlled oscillator (GVCO)) 2, N (natural number other than 1) data discriminating and reproducing circuits 3, a continuous clock generation circuit 4, N continuous clock synchronization circuits 5, and a phase selector 6.

Figure 2:
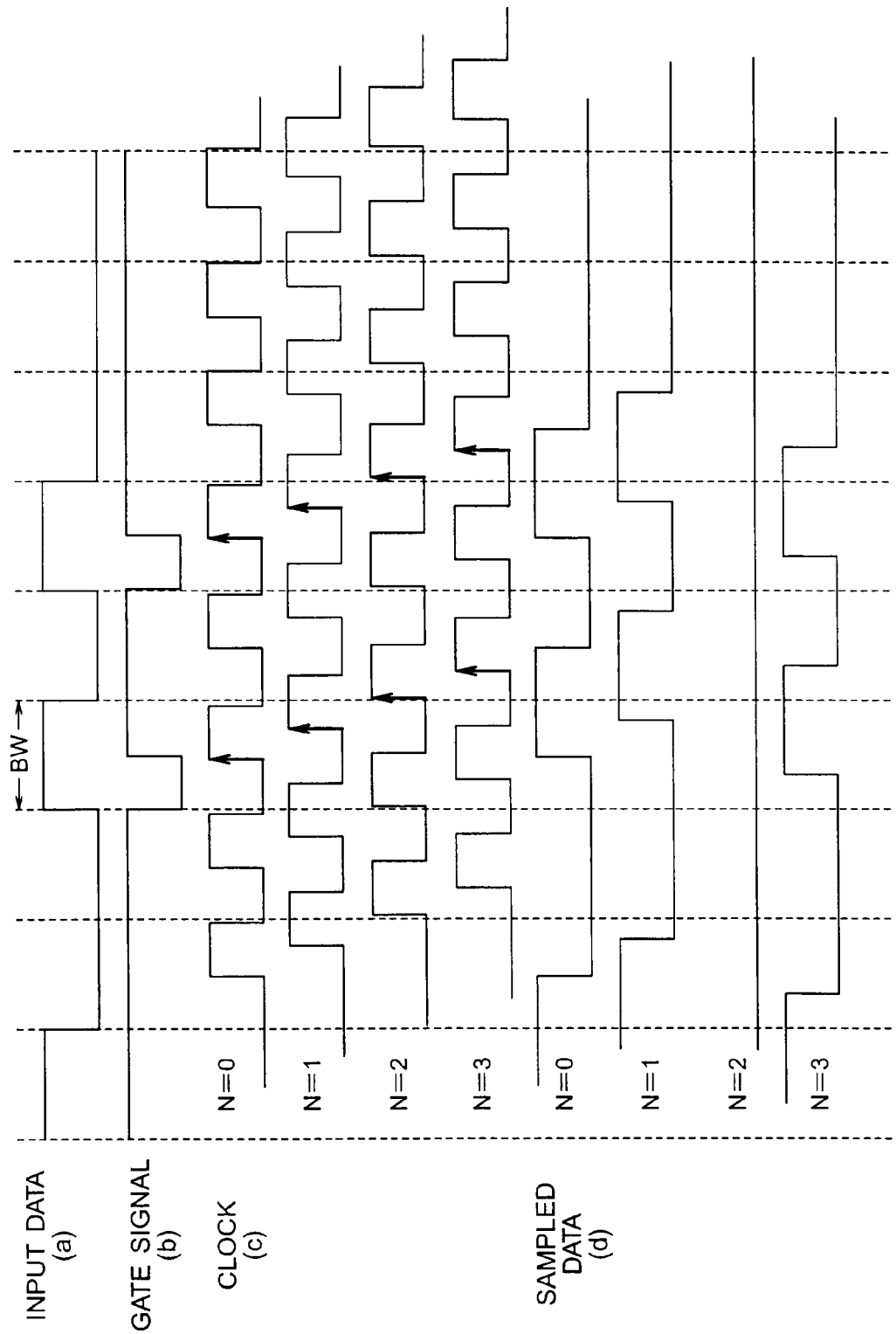
FIG. 2 is a timing chart illustrating operations of an input data phase detection circuit, a gated multiphase oscillator, and a data discriminating and reproducing circuit in the data recovery circuit according to Embodiment 1 of the present invention.
Figure 3:
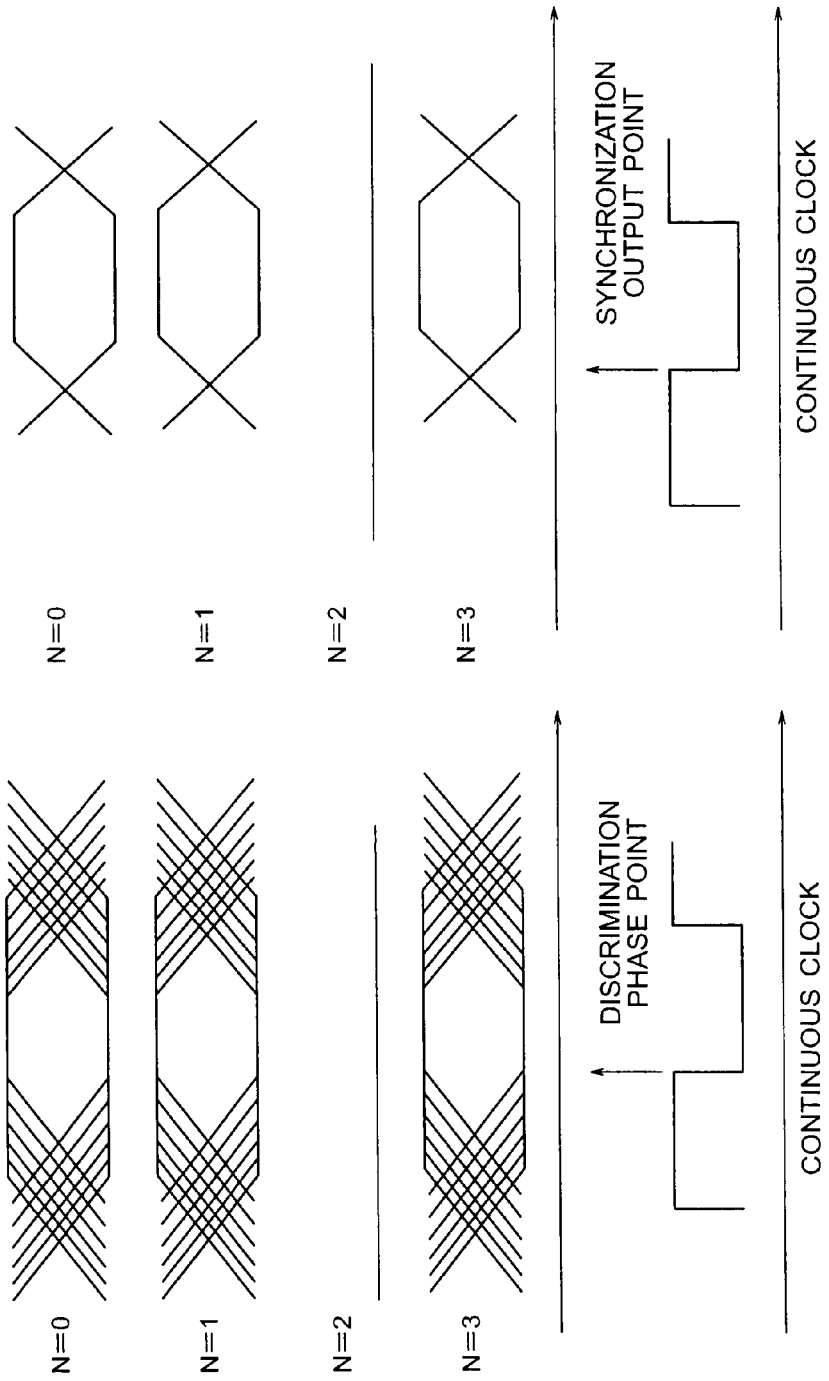
FIGS. 3A and 3B illustrate an operation of a continuous clock synchronization circuit in the data recovery circuit according to Embodiment 1 of the present invention.

Next, an operation of the data recovery circuit according to Embodiment 1 is described with reference to the attached drawings. FIG. 2 is a timing chart illustrating operations of the input data phase detection circuit, the gated multiphase oscillator, and the data discriminating and reproducing circuit in the data recovery circuit according to Embodiment 1 of the present invention. In other words, FIG. 2 illustrates an operation from data input to data discrimination and recovery.

In the description of the following circuit operation, circuit logic is described, and hence the influence of a timing deviation such as a circuit delay, which is caused in an actual circuit, is omitted. Specifically, a case where the number of phases N is 4 is described.

The input data phase detection circuit 1 extracts, as a gate signal (b), a signal synchronized with input data (a) from the input data (a), and outputs the gate signal (b). In other words, when the input data (a) is input from an optical preamplifier (not shown) provided at the preceding stage, as illustrated in FIG. 2, the input data phase detection circuit 1 generates the gate signal (b) selectively synchronized with only a rising phase of the input data (a) (Note that the input data phase detection circuit 1 may generate the gate signal (b) selectively synchronized with only a falling phase of the input data (a)). The input data phase detection circuit 1 can be constructed using a normal logic circuit. For simple description, assume that an interval for which the gate signal (b) output here becomes logic L (Low) is shorter than a half period of clocks described later.

Next, the gated multiphase oscillator 2 generates N-phase (N phases) clocks (c) obtained by dividing a bit width BW of the input data (a) into N, in phase synchronization with the gate signal (b) output from the input data phase detection circuit 1. In other words, as illustrated in FIG. 2, the gated multiphase oscillator 2 produces oscillation at the rising of the gate signal (b) as a trigger during an interval of logic H (High) of the gate signal (b). In this case, an interval of logic L of the gate signal (b) is shorter than the half period of the clocks described later, and hence the gated multiphase oscillator 2 does not stop oscillation and thus produces continuous oscillation while phase synchronization is reproduced again at a trigger point. A specific example of the gated multiphase oscillator 2 is a four-phase oscillator. Therefore, as illustrated in FIG. 2, the bit width BW of the input data (a) is divided into 4 (=N) and the four-phase (N=0, 1, 2, and 3) clocks (c) are output with delay time periods shifted by BW/4 with respect to the bit width BW of the input data (a).

Next, the N data discriminating and reproducing circuits 3 sample the input data (a) based on the N-phase clocks (c) output from the gated multiphase oscillator 2 and output sampled data (d). In other words, as illustrated in FIG. 2, upon receiving the clocks (c) from the gated multiphase oscillator 2 as sampling clocks, the data discriminating and reproducing circuits 3 output the sampled data (d) which are synchronized with the respective phase clocks (c) and obtained by sampling the input data (a). The sampling is performed in synchronization with the rising edges of the respective phase clocks (c). Of the sampled data (d), data discriminated based on the clock (c) of N=2 cannot be discriminated because the edge of the input data (a) and the sampling edge are overlapped with each other at substantially the same time position, and hence undefined data is output. FIG. 2 illustrates the case where the undefined data is logic L. There is a state in which the input data (a) cannot be sampled in addition to the undefined state resulting from the overlap of both the edges. Such a state is also referred to as the undefined state. That is, herein, a state other than the state in which the sampling can be normally performed is referred to as the undefined state.

FIGS. 3A and 3B illustrate an operation of a continuous clock synchronization circuit in the data recovery circuit according to Embodiment 1 of the present invention. In other words, FIGS. 3A and 3B illustrate an operation during which the sampled data (d) are input to the continuous clock synchronization circuits 5 and output as phase synchronization data (e).

The N continuous clock synchronization circuits 5 synchronize the sampled data (d) output from the data discriminating and reproducing circuits 3 with a continuous clock output from the continuous clock generation circuit 4 and output the synchronized sampled data (d) as phase synchronization data (e). In other words, when the sampled data (d) are input, the continuous clock synchronization circuits 5 store the sampled data (d) in order. The continuous clock synchronization circuits 5 each includes, for example, a sequential storage device and can be easily realized using a normal first-in-first-out (FIFO) system.

First, the input of the continuous clock synchronization circuits 5 is described. The sampled data (d) are output as data synchronized with the clocks (c) from the gated multiphase oscillator 2 and stored in the continuous clock synchronization circuits 5. The clocks (c) from the gated multiphase oscillator 2 are generated as clocks instantly synchronized in phase with the input data (a). Therefore, as illustrated in FIG. 3A, the clocks are input as the sampled data (d) on which jitter components depending on a fluctuation of the input data (a) are superimposed.

Next, the output of the continuous clock synchronization circuits 5 is described. As illustrated in FIG. 3B, the continuous clock synchronization circuits 5 synchronize the stored sampled data (d) with the continuous clock output from the continuous clock generation circuit 4 and output the synchronized sampled data as the phase synchronization data (e). The continuous clock generation circuit 4 is used as a reference clock generator of the entire optical receiver. The generated continuous clock includes no jitter component and thus is a clock whose phase is not changed. Therefore, the phase synchronization data (e) are output as data from which the jitter components are removed, and which are synchronized with the continuous clock, that is, the reference clock.

Next, an operation of the phase selector 6 is described. The phase selector 6 selects the phase synchronization data (e) having an optimum discrimination phase with the largest phase margin with respect to the input data (a), from the phase synchronization data (e) output from the continuous clock synchronization circuits 5, and outputs the selected phase synchronization data as recovery data (f). As described above, the phase synchronization data (e) from which the jitter components are removed, and which are synchronized with the continuous clock (reference clock), are input to the phase selector 6. The phase selector 6 includes, for example, a logical table circuit and is set so as to select the phase synchronization data (e) in the phase having a maximum phase difference, from the phase of the phase synchronization data (e) which is undefined. In the example illustrated in FIGS. 2 and 3, the phase synchronization data (e) in the phase of N=2 is undefined (logic L), and hence the phase synchronization data (e) in the phase of N=0 in which the phase difference from the phase of N=2 is maximum is selected and output as the recovery data (f). The logical table circuit can be realized using a normal gate circuit and easily provided using a complementary metal oxide semiconductor (CMOS), a filed programable gate array (FPGA) or the like.

A method of selecting the recovery data (f) with respect to the input data (a) can be arbitrarily realized. When the phase selection operation for selecting the phase in which the phase difference from the undefined phase is maximum is executed in only one cycle (one time), it is likely to cause an error. Therefore, the phase selector 6 repeats the phase selection operation for a plurality of cycles to select the phase synchronization data (e) in a phase which is selected a largest number of times as a phase in which the phase difference is maximum, of the phases in which the phase difference is maximum. In other words, the phase selector 6 stores the N-phase phase synchronization data (e) output from the continuous clock synchronization circuits 5 for a predetermined time period (for example, 10 cycles), counts the phase, in which the phase difference from the undefined phase is maximum, for a predetermined time period for each phase, and selects the phase synchronization data (e) in the phase in which the count is largest. In the example illustrated in FIG. 2, when the phase of N=2 is in the undefined state for at least 9 cycles (bits) and the phase (N=0) in which the phase difference from the undefined phase (N=2) is maximum is counted for an arbitrary time period (for example, 10 cycles) for each phase, the phase in which the count is largest is the phase of N=0 in which the count is "9", and hence the phase synchronization data (e) in the phase of N=0 is selected.

Hereinafter, an effect of Embodiment 1 is described. In a case where the bit width BW of the input data (a) is assumed to be 1 and an apparent bit width becomes $1-d_j$ because of a jitter component $d_j$, when a phase margin of the data discriminating and reproducing circuit 3 is expressed by $d_p$, it is necessary to satisfy the following Expression (1) to obtain recovery data with no error.

[Expression 1]

$$1 - d_j > d_p \quad (1)$$

For example, when the phase margin is 270°, $d_p=270°/360°=0.75$, and hence an allowable jitter component $d_j$ becomes smaller than 0.25.

Next, the case of the data recovery circuit according to Embodiment 1 is described. The data recovery circuit according to Embodiment 1 samples the input data (a) based on the multiphase clocks. Therefore, even when the bit width becomes narrower because of the jitter component, it is sufficient that a clock edge corresponding to one phase which can be sampled during a bit window is input, and hence a condition for obtaining the recovery data (f) with no error can be expressed by the following Expression (2).

[Expression 2]

$$1 - dj > \frac{1}{N} \quad (2)$$

Note that a minimum value of discrimination sensitivity of the data discriminating and reproducing circuit 3 is not taken into account because the value is vary small.

Figure 4:
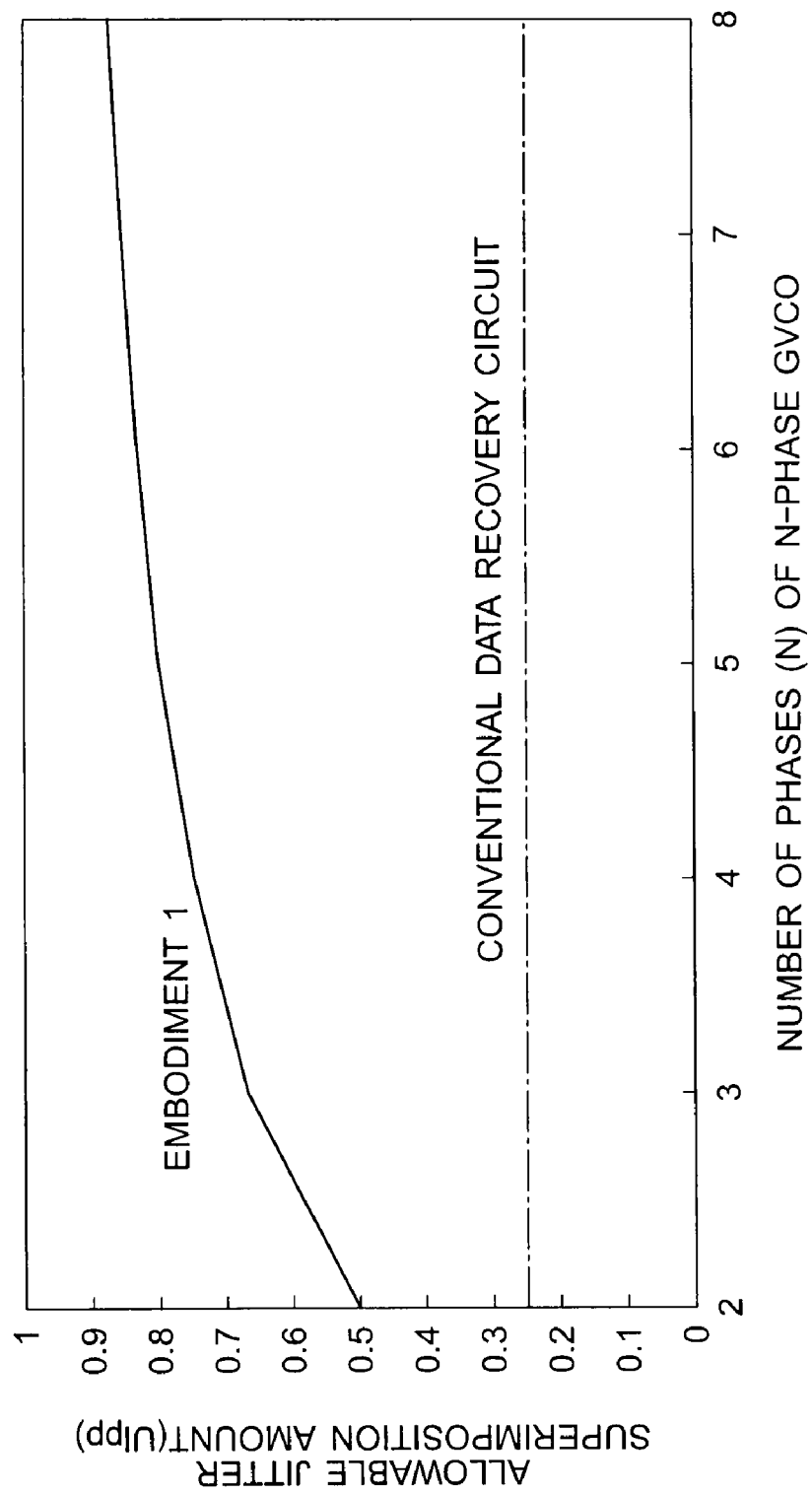
FIG. 4 illustrates a relationship of an allowable jitter amount with respect to the number of phases N in the data recovery circuit according to Embodiment 1 of the present invention and a conventional data recovery circuit.

FIG. 4 illustrates a relationship of the allowable jitter amount dj with respect to the number of phases N using Expressions (1) and (2) described above. As is apparent from FIG. 4, although the allowable jitter amount in the conventional data recovery circuit is 0.25 (UIpp), a jitter amount of up to 0.75 (UIpp) can be allowed in Embodiment 1 in the case where the number of phases N is 4.

According to Embodiment 1, the data recovery circuit includes the input data phase detection circuit 1 for outputting the gate signal (b) synchronized with the rising or falling phase of the input data (a), the gated multiphase oscillator 2 for instantly generating the N-phase clocks (c) having phase differences in order based on the gate signal (b) as the trigger, the data discriminating and reproducing circuits 3 for outputting the sampled data (d) of the input data (a) which are synchronized with the clocks (c) based on the clocks (c) as the sampling clocks, the continuous clock generation circuit 4 for generating the continuous clock which is the reference clock, the continuous clock synchronization circuits 5 for synchronizing the stored sampled data (d) with the continuous clock and outputting the synchronized sampled data as the phase synchronization data (e), and the phase selector 6 for selecting the phase synchronization data (e) having the optimum discrimination phase with the largest phase margin with respect to the input data (a) and outputting the selected phase synchronization data as the recovery data (f). Accordingly, even when the jitter component is superimposed on the input burst light signal, the data discriminated in the optimum discrimination phase can be reproduced from the input data (a) at high speed and the data synchronized with the reference clock can be output.

Embodiment 2

Figure 5:
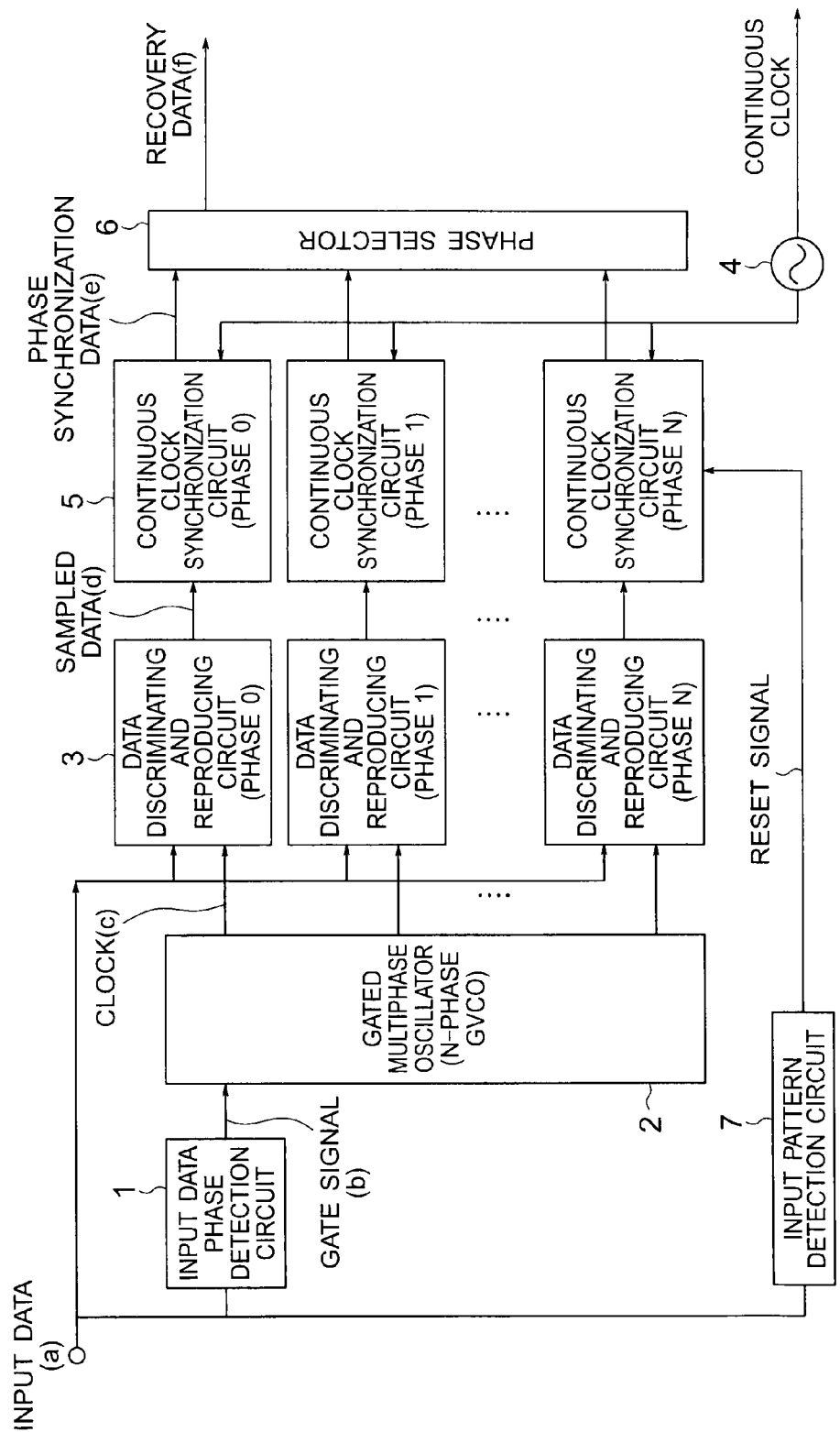
FIG. 5 is a block diagram illustrating a structure of a data recovery circuit according to Embodiment 2 of the present invention.
Figure 6:
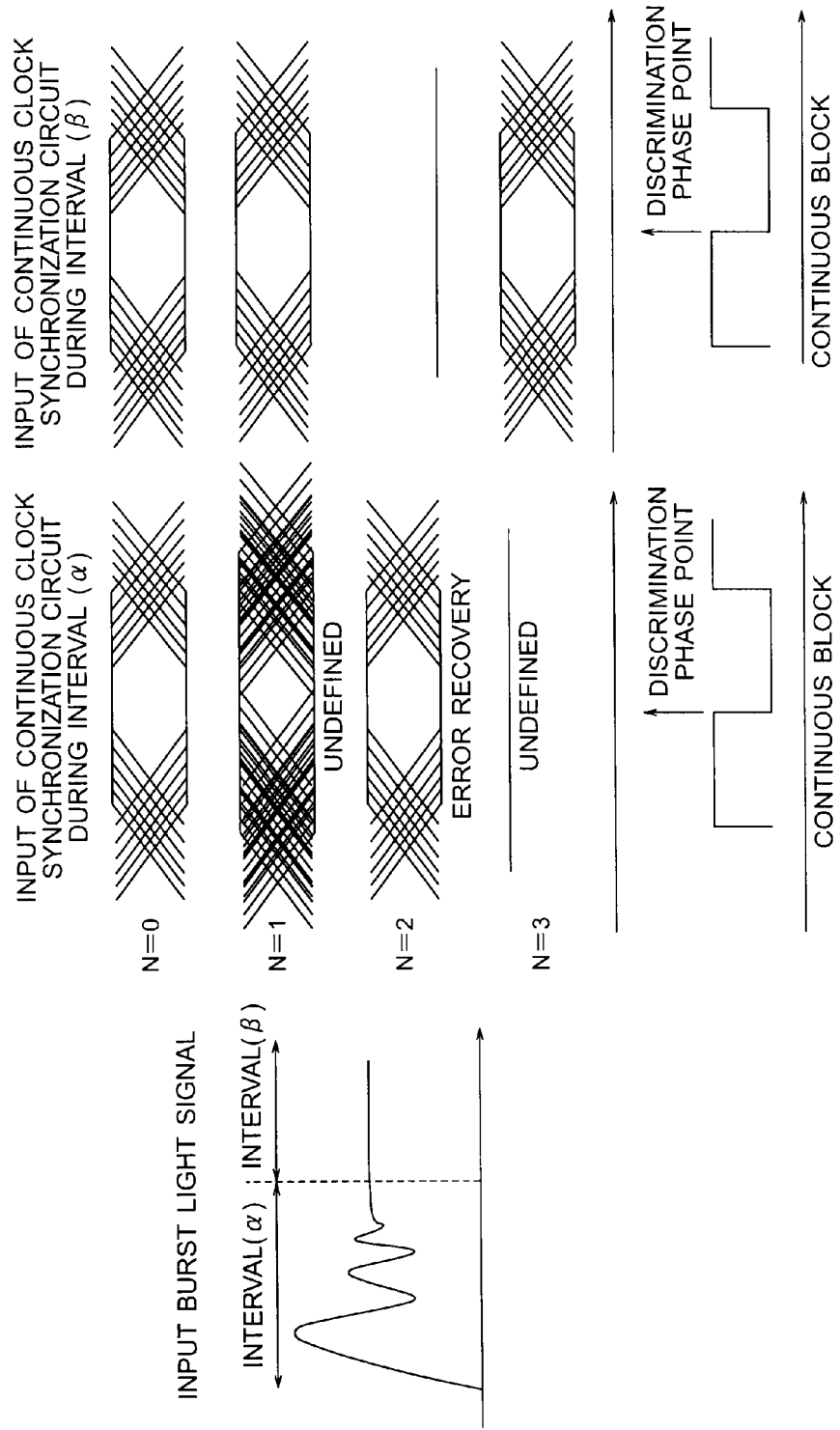
FIGS. 6A, 6B and 6C illustrate states of stored data of a continuous clock synchronization circuit during an interval including an instant at which a burst light signal is input and during an interval for which the burst light signal is stabilized at a constant value in the data recovery circuit according to Embodiment 2 of the present invention.

A data recovery circuit according to Embodiment 2 of the present invention is described with reference to FIGS. 5 and 6. FIG. 5 is a block diagram illustrating a structure of the data recovery circuit according to Embodiment 2 of the present invention.

In FIG. 5, the data recovery circuit according to Embodiment 2 includes an input data phase detection circuit 1, a gated multiphase oscillator (N-phase GVCO) 2, N data discriminating and reproducing circuits 3, a continuous clock generation circuit 4, N continuous clock synchronization circuits 5, a phase selector 6, and an input pattern detection circuit 7.

Next, an operation of the data recovery circuit according to Embodiment 2 is described with reference to the attached drawings.

Embodiment 2 is a modified example of Embodiment 1 described above. The sampling operation of the input data, the continuous clock synchronization operation, and the phase selection operation are similar to the operations of Embodiment 1, and thus the descriptions thereof are omitted.

Hereinafter, an input pattern detection operation of the input pattern detection circuit 7 is described.

When the input data (a) is input, the input pattern detection circuit 7 generates a logic H signal only when an input data pattern during an arbitrary time width (bit interval) is matched with a reference pattern held in advance in the input pattern detection circuit 7. The input pattern detection circuit 7 supplies the logic H signal as a reset signal to each of the N continuous clock synchronization circuits 5. The reference pattern is equal to a fixed bit pattern included in advance in the input data (a), that is, the input burst light signal.

The storage operation of each of the N continuous clock synchronization circuits 5 is controlled in response to the reset signal. Stored data are discarded and erased at the instant at which the reset signal is input, and the storage of the sampled data (d) is started again. The continuous clock synchronization circuits 5 each include, for example, a sequential storage device with reset signal. When the reset signal is input, the storage of the sampled data (d) is started by a first-in-first-out (FIFO) system.

Hereinafter, an effect of Embodiment 2 is described. FIGS. 6A, 6B and 6C illustrate states of stored data of the continuous clock synchronization circuit 5 during an interval (α) including an instant at which the burst light signal is input and during an interval (β) for which the burst light signal is stabilized at a constant value. In general, as illustrated in FIG. 6A, immediately after the burst light signal is input, distorted data are normally reproduced because of response characteristics of an optical preamplifier (not shown) or the like which is used at the preceding stage. In Embodiment 2, clocks depending on the input data are generated, and hence data synchronized with distorted clocks are input. Therefore, as illustrated in FIGS. 6B and 6C, unlike the stored data during the interval (β) for which the burst light signal is stabilized at the constant value, the stored data during the interval (α) immediately after the burst light signal is input includes an error, and thus stores erroneous operation signals. In order to disable the erroneous operation signals and to store only effective normal data, the fixed bit pattern set in advance is inserted to an arbitrary interval between the input data (a). When the fixed bit pattern is matched with the reference pattern held in advance in the input pattern detection circuit 7, the continuous clock synchronization circuits 5 desirably start the sequential storage operation.

According to Embodiment 2, the data recovery circuit includes the input data phase detection circuit 1, the gated multiphase oscillator 2, the data discriminating and reproducing circuits 3, the continuous clock generation circuit 4, the continuous clock synchronization circuits 5 which start the sequential storage operation of the sampled data when the reset signal is input, the phase selector 6, and the input pattern detection circuit 7 for outputting the reset signal only when the fixed bit pattern of the input data is matched with the reference pattern. Accordingly, even when the burst light signal is input and erroneous data is included during the interval (α) immediately after the input thereof, the data discriminated in the optimum discrimination phase can be reproduced from the input data at high speed and the data synchronized with the reference clock can be output.

Embodiment 3

Figure 7:
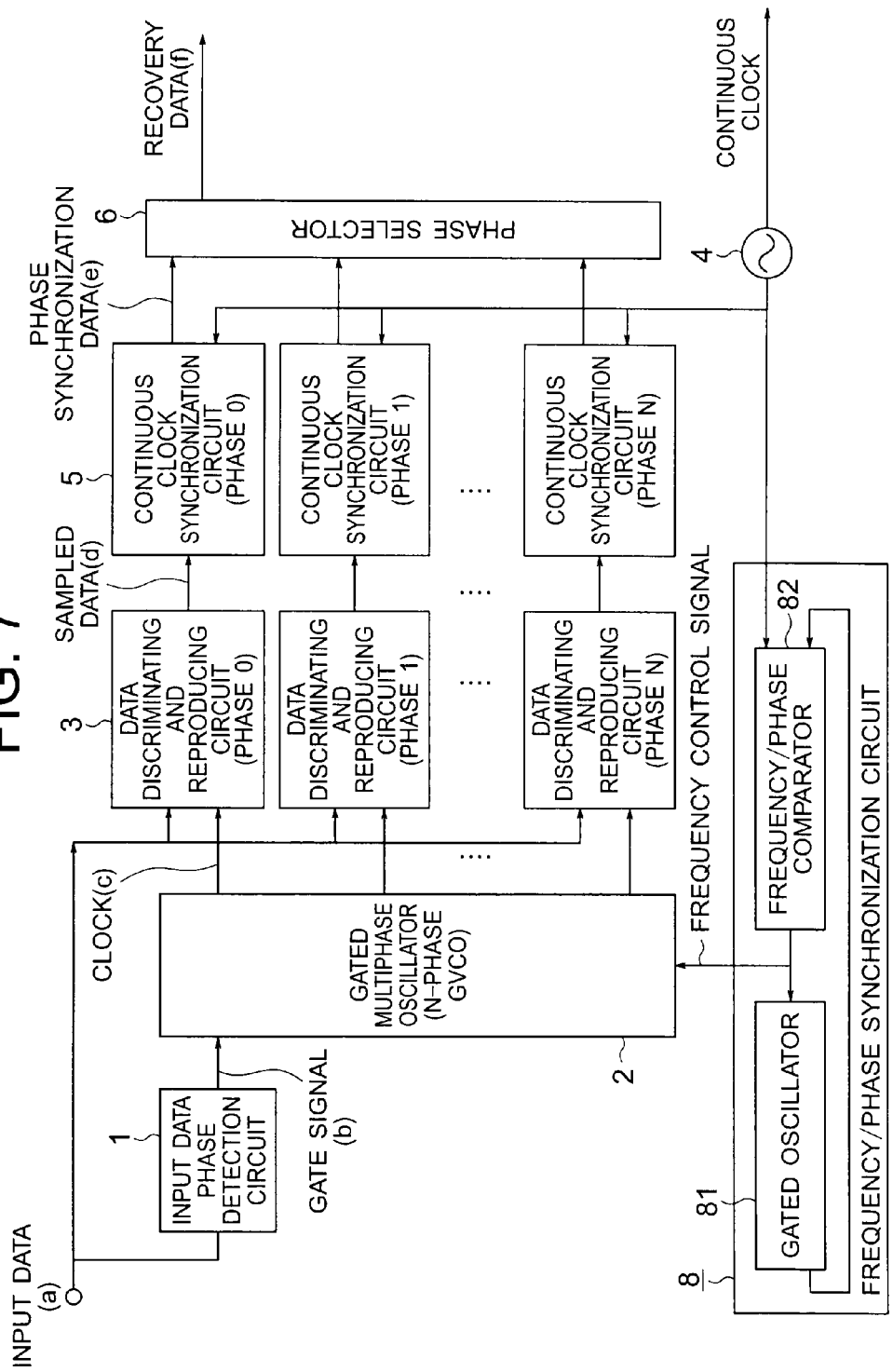
FIG. 7 is a block diagram illustrating a structure of a data recovery circuit according to Embodiment 3 of the present invention.
Figure 8A:
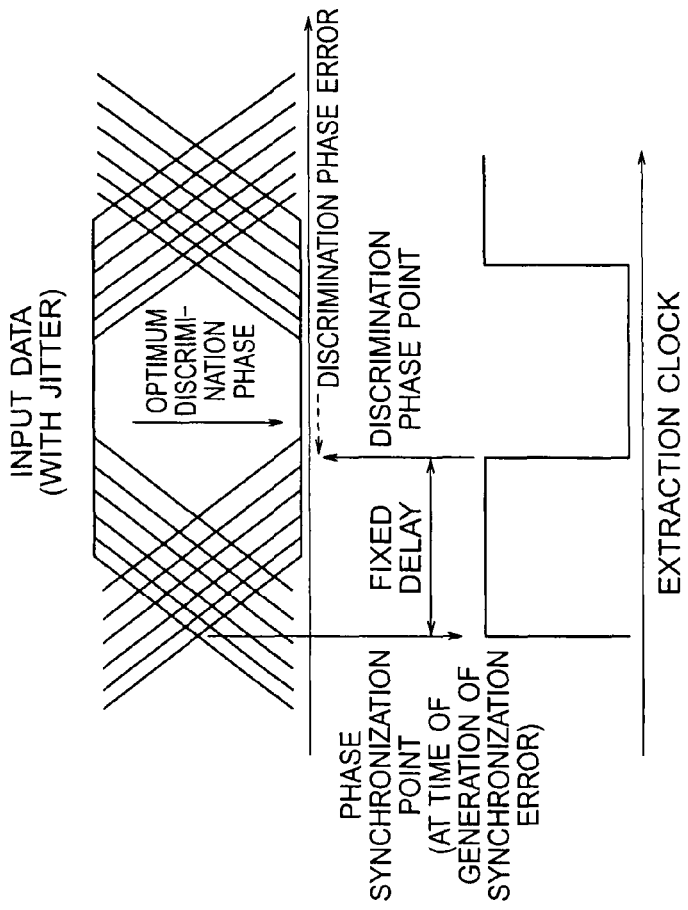
FIGS. 8A and 8B illustrate operations of the conventional data recovery circuit in a case where a jitter component is not included in input data and in a case where the jitter component is superimposed thereon.
Figure 8B:
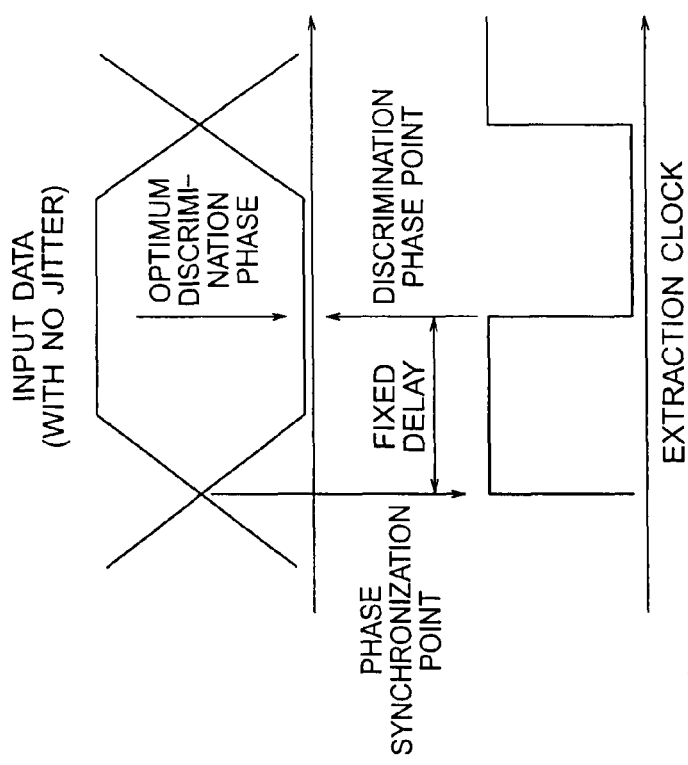

A data recovery circuit according to Embodiment 3 of the present invention is described with reference to FIG. 7. FIG. 7 is a block diagram illustrating a structure of the data recovery circuit according to Embodiment 3 of the present invention.

In FIG. 7, the data recovery circuit according to Embodiment 3 includes an input data phase detection circuit 1, a gated multiphase oscillator (N-phase GVCO) 2, N data discriminating and reproducing circuits 3, a continuous clock generation circuit 4, N continuous clock synchronization circuits 5, a phase selector 6, and a frequency/phase synchronization circuit 8.

The frequency/phase synchronization circuit 8 includes a gated oscillator 81 and a frequency/phase comparator 82.

Next, an operation of the data recovery circuit according to Embodiment 3 is described with reference to the attached drawings.

Embodiment 3 is a modified example of Embodiment 1 described above. The sampling operation of the input data, the continuous clock synchronization operation, and the phase selection operation are similar to the operations of Embodiment 1, and thus the descriptions thereof are omitted. Hereinafter, an operation of the frequency/phase synchronization circuit 8 is described.

The gated oscillator 81 included in the frequency/phase synchronization circuit 8 has the same circuit structure as the gated multiphase oscillator 2 and is substantially equal in oscillation frequency to the gated multiphase oscillator 2. The frequency/phase comparator 82 included in the frequency/phase synchronization circuit 8 detects an error between a frequency/phase of a clock output from the gated oscillator 9 and a frequency/phase of the continuous clock generated by the continuous clock generation circuit 4 and outputs an error signal as a frequency control signal.

The gated multiphase oscillator 2 includes, for example, a ring oscillation circuit. The ring oscillation circuit includes: a plurality of (N) delay elements whose delay amounts are arbitrarily controlled based on the frequency control signal; and a gating circuit for outputting AND results between outputs of the N delay elements and the gate signal (b). N outputs of the gating circuit correspond to N-phase clocks (c) with relative phase differences (delay differences). A gate signal of the gated oscillator 81 is logically fixed, thereby performing continuous oscillation.

The gated oscillator 81 changes the oscillation frequency based on the frequency control signal to minimize the error signal from the frequency/phase comparator 82. Therefore, in a steady state, the output clock of the continuous clock generation circuit 4 which is the reference clock of the optical receiver is synchronized in frequency/phase with the output clock of the gated oscillator 81. The synchronization information is transferred as the frequency control signal to the gated multiphase oscillator 2. As a result, the oscillation frequency of the gated multiphase oscillator 2 is also controlled so as to be synchronized with the continuous clock.

Hereinafter, an effect of Embodiment 3 is described. When the frequency/phase synchronization circuit 8 is not provided, the oscillation frequency of the gated multiphase oscillator 2 is independently determined based on constants resulting from a self-circuit structure, and therefore includes a frequency deviation from the output clock of the continuous clock generation circuit 4 which is the reference clock of the optical receiver. When the frequency deviation is large, an input data speed is not matched with an output data speed in the continuous clock synchronization circuits 5 serving as the sequential storage device, and hence a problem such as a storage overflow occurs. Even when the frequency deviation is suppressed by contriving circuit constants, it is difficult to perform self-oscillation at a stable frequency for a change in ambient temperature or the like. When the frequency/phase synchronization circuit 8 provided in Embodiment 3 is applied, it is possible to provide the stable gated multiphase oscillator 2 which is synchronized in phase with the input data at high speed and synchronized in frequency with the continuous clock generation circuit 4.

According to Embodiment 3, the data recovery circuit includes the input data phase detection circuit 1, the gated multiphase oscillator 2 for generating the clocks synchronized with the continuous clock based on the frequency control signal, the N-phase data discriminating and reproducing circuits 3, the continuous clock generation circuit 4, the continuous clock synchronization circuits 5, the phase selector 6, and the frequency/phase synchronization circuit 8 for outputting, as the frequency control signal, the synchronization information of the continuous clock generated by the continuous clock generation circuit 4. Accordingly, even when the gated multiphase oscillator 2 includes the frequency deviation from the continuous clock of the continuous clock generation circuit 4, the data discriminated in the optimum discrimination phase can be reproduced from the input data with the stable frequency oscillation clock at high speed and the data synchronized with the reference clock can be output.

The invention claimed is:

1. A data recovery circuit, comprising:
    an input data phase detection circuit for extracting, as a gate signal, a signal synchronized with input data from the input data and outputting the gate signal;
    a gated N-phase oscillator for generating N-phase clocks obtained by dividing a bit width of the input data into N-phase clocks in phase synchronization using the gate signal output from the input data phase detection circuit;
    N data discriminating and reproducing circuits for sampling the input data based on the N-phase clocks output from the gated N-phase oscillator and outputting sampled data;
    a continuous clock generation circuit for generating a continuous clock which is a reference clock;
    N continuous clock synchronization circuits for synchronizing the sampled data output from the N data discriminating and reproducing circuits with the continuous clock output from the continuous clock generation circuit and outputting the synchronized sampled data as phase synchronization data; and
    a phase selector for selecting, from the phase synchronization data output from the N continuous clock synchronization circuits, phase synchronization data having an optimum discrimination phase with a largest phase margin with respect to the input data and outputting the selected phase synchronization data as recovery data.

2. A data recovery circuit according to claim 1, further comprising an input pattern detection circuit for outputting a reset signal when a fixed bit pattern included in the input data matches with a reference pattern held in advance,
    wherein the N continuous clock synchronization circuits start a sequential storage operation of the sampled data when the reset signal is input.

3. A data recovery circuit according to claim 1, further comprising a frequency/phase synchronization circuit for outputting, as a frequency control signal, synchronization information of the continuous clock generated by the continuous clock generation circuit,
    wherein the gated N-phase oscillator generates clocks synchronized with the continuous clock based on the frequency control signal.

4. A data recovery circuit according to claims 1, 2, or 3, wherein:
    the input data phase detection circuit generates the gate signal synchronized with a rising phase or falling phase of the input data; and an interval in which the gate signal is logic L is shorter than a half period of the clocks generated from the gated N-phase oscillator.

5. A data recovery circuit according to claims 1 or 2, wherein the gated N-phase oscillator generates the N-phase clocks with delay time periods relatively shifted by 1/N of the bit width of the input data during an interval in which the gate signal is logic H, at a rising of the gate signal as a trigger.

6. A data recovery circuit according to claims 1, 2, or 3, wherein the N data discriminating and reproducing circuits receive the clocks as sampling clocks and output sampled data which are results obtained by sampling the input data synchronized with rising edges of the clocks.

7. A data recovery circuit according to claims 1 or 3, wherein each of the N continuous clock synchronization circuits includes a sequential storage device, stores the sampled data by a first-in-first-out system, and outputs the stored sampled data as the phase synchronization data in synchronization with the continuous clock.

8. A data recovery circuit according to claims 1, 2, or 3, wherein the phase selector repeats, for a plurality of cycles, an phase selection operation for selecting a phase in which a phase difference from an undefined phase is maximum in the phase synchronization data, to select phase synchronization data corresponding to a phase which is selected a largest number of times as the phase in which the phase difference is maximum, of phases in which the phase difference is maximum, and to output the selected phase synchronization data as the recovery data.

9. A data recovery circuit according to claim 2, wherein each of the N continuous clock synchronization circuits comprises a sequential storage device with the reset signal, starts, when the reset signal is input, storing the sampled data by a first-in-first-out system, and outputs the stored sampled data as the phase synchronization data in synchronization with the continuous clock.

10. A data recovery circuit according to claim 3, wherein the frequency/phase synchronization circuit includes:
 a gated oscillator which has the same circuit structure as the gated N-phase oscillator and is substantially equal in oscillation frequency to the gated N-phase oscillator; and
 a frequency/phase comparator for detecting an error between a frequency/phase of a clock output from the gated oscillator and a frequency/phase of the continuous clock output from the continuous clock generation circuit and outputting an error signal as the frequency control signal.

11. A data recovery circuit according to claim 10, wherein:
 the gated N-phase oscillator comprises a ring oscillation circuit comprising:
  N delay elements whose delay amounts are arbitrarily controlled based on the frequency control signal; and
  a gating circuit for outputting AND results between outputs of the N delay elements and the gate signal; and
 N outputs of the gating circuit correspond to the N-phase clocks having relative phase differences.

* * * * *